No. 608,801.  
L. W. SLACK.  
PIGEON TRAP.  
(Application filed Feb. 25, 1898.)
Patented Aug. 9, 1898.
(No Model.)
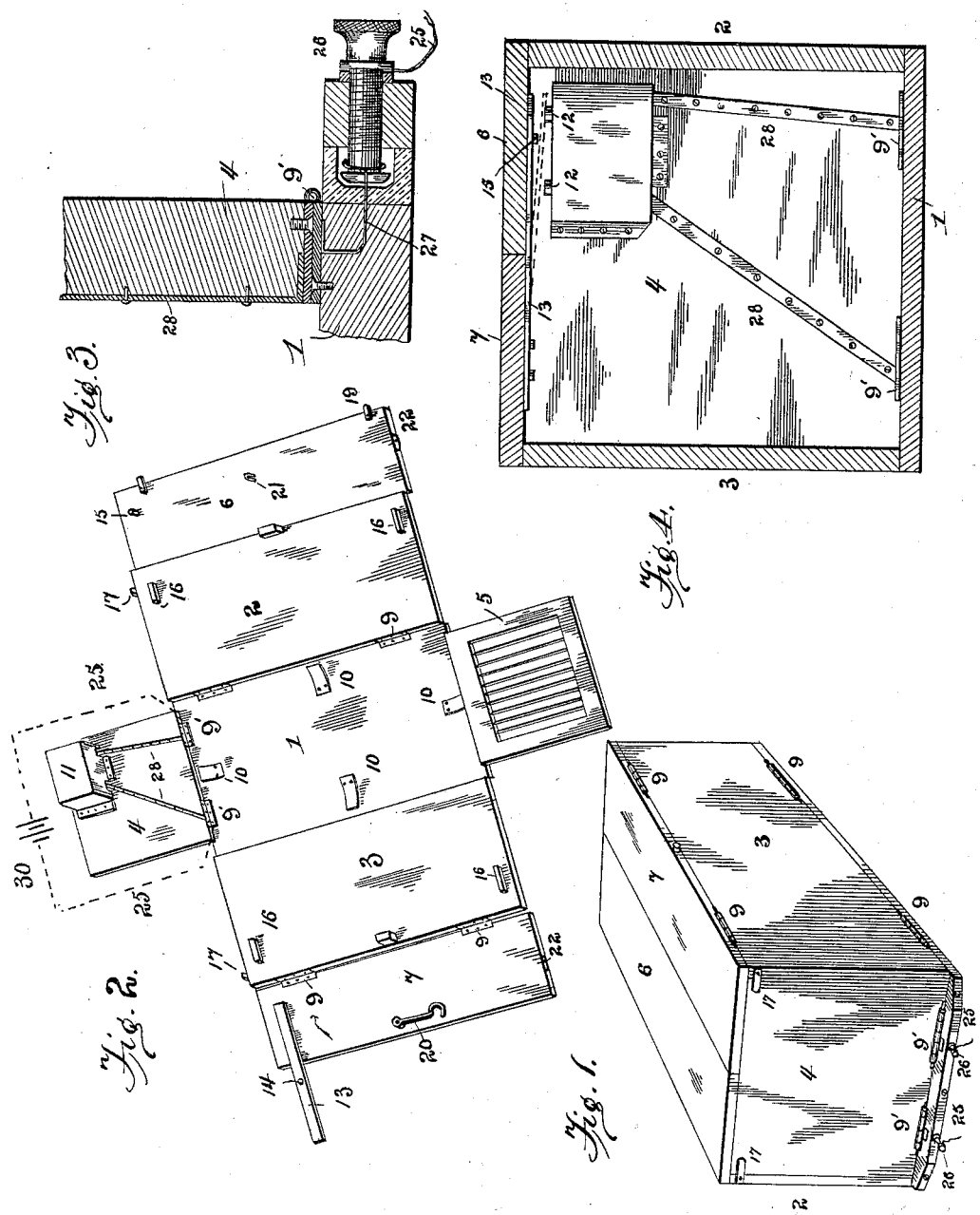
WITNESSES  
Chas. K. Davies.  
Elmer W. Giusta
INVENTOR  
L. W. Slack  
By W. H. Bartlett  
Attorney

UNITED STATES PATENT OFFICE.

LEWIS W. SLACK, OF WILLIAMSPORT, PENNSYLVANIA.

PIGEON-TRAP.

SPECIFICATION forming part of Letters Patent No. 608,801, dated August 9, 1898.

Application filed February 25, 1898. Serial No. 671,593. (No model.)

*To all whom it may concern:*

Be it known that I, LEWIS W. SLACK, residing at Williamsport, in the county of Lycoming and State of Pennsylvania, have invented certain new and useful Improvements in Pigeon-Traps, of which the following is a specification, reference being had therein to the accompanying drawings.

This invention relates to shooting-traps from which live pigeons may be liberated for the display of marksmanship.

The object of the invention is to produce a "trap" or box of compact form which will open outward in all primary directions simultaneously, so there will be no one particular direction in which the bird will be likely to fly, the trap or box being actuated to open by an electric impulse.

Figure 1 is a perspective view of the box or trap, showing wire connections to the binding-posts and hinges at one end of trap. Fig. 2 is a perspective view of the trap open. Fig. 3 is a sectional detail showing electrical connections to hinge. Fig. 4 is a cross-section of the box or trap just inside the door bearing the magnets.

The trap is preferably composed of bottom 1, to which the sides 2 3 and the ends 4 5 are connected by hinges 9 9, as usual. To the sides 2 3 the half-sections 6 7, forming the top of the box, are connected by hinges 9 9 9' 9'. To the base-piece 1 flat springs 10 10 are connected, so that their edges rest under the edges of the box sides and ends when the box is closed, the tendency of these springs being to throw the sides and ends of the box open. One end 5 of the box may have a grating, as indicated. The other end preferably supports the electro magnet or magnets contained in the box 11, and when the box is closed the ends of the electromagnets 12 12 are a trifle below the closed top, as indicated in Fig. 4. The flap or top section 6 has a light metallic spring-piece 13 connected thereto, with one end projecting, as shown in Figs. 2 and 4. In this projecting end there is a hole 14, which closes over a short pin 15, which projects from the cover-section 6 when the box is closed, as in Fig. 4.

The ends of electromagnets 12 12 lie directly below the spring-piece 13 when the box is closed, and the spring-piece 13 forms an armature, which is attracted by the magnets 12 when the magnets are active, and the spring-armature 13, taking the position shown in dotted lines, Fig. 4, releases the pin 15, enabling the springs 10 to throw down the sides and ends, so that the box opens out flat, as in Fig. 2.

The ends 4 and 5 close against stops 16 to prevent strain on the hinges, and catches 17, (which may be either rigid or movable,) connected to the sides 2 3, hold the ends upright when the sides are closed. Similar catches are attached to the other ends of the side or to the top pieces to hold the end 5 closed. To insure a close fit of the parts the strips or buttons 19 are attached to one of the top sections and extend across the joint in the top when closed, and for transportation without danger of unlocking the hook 20 may engage eye 21 on the cover, thus locking the box beyond the power of release by the electromagnet.

The end 5 may be held up by turn-buttons 22, pivoted to the cover, so as to turn over the edge or away from the cover, as usual with turn-buttons.

Electric connection is made to the electromagnets by wires 25, connecting two binding-posts 26. These binding-posts are preferably insulated and connected by wires or other metallic connections 27 to the lower leaves of hinges 9', which hinges connect the end of the box to the bottom thereof. The upper leaves of these hinges 9' are connected by metal strips 28 to the coils of the electromagnets, the same being of any usual construction.

The wires 25 lead to a battery, as 30, at any distance found desirable, and the battery-circuit is opened and closed in the usual manner, through the metallic connections described, to control the electromagnets, and thereby release the catch and permit the trap to be thrown open by its springs when desirable.

The trap having been closed, as in Fig. 1, and being held in closed position, so that the release of armature 13 causes the trap to fly open, the electrical connections will be manipulated to close circuit and excite the magnets and operate the armature to unlock the trap when desirable, when the trap will fly open and spread out flat, as in Fig. 2, releasing any confined bird which may be therein.

What I claim is—

1. In a box-trap for confining live pigeons, the base of the trap having hinged sides, ends, and top, a metallic armature connected to one of the folding pieces and engaging a catch on another piece to hold the trap closed, and an electromagnet carried by another of the hinged pieces, and in position to act on the armature to release it from the catch, whereby the box is permitted to open when the magnet acts to release the armature from the catch, all combined substantially as described.

2. In a box or trap for confining live pigeons, the base and hinged sides, the ends, the top in sections connected to the hinged sides, an electromagnet on one of the hinged parts connected by metallic connections through the hinges to a battery outside the trap, and an armature on another of the hinged parts in position to hold the trap closed, but to release the same under the influence of the magnet, all combined substantially as described.

3. In a box-trap for live pigeons, the bottom having hinged sides, and the sides having hinged top sections connected thereto, the ends hinged to the bottom and held closed by catches on the sides and top, the opening or expanding springs, and a detachable catch on one of the cover-sections, all combined substantially as described.

4. In a box for live pigeons, the bottom, sides, ends, and cover hinged together substantially as described, the magnet carried by one of the ends and having metallic strips extending therefrom to the hinges, binding-posts in the bottom connected by metallic connection to the hinges, an external battery and wires connecting to said binding-posts, and a spring-armature connected to one of the hinged pieces, in proximity to the magnet, and engaging a catch on one of the hinged parts, all combined substantially as described.

In testimony whereof I affix my signature in presence of two witnesses.

LEWIS W. SLACK.

Witnesses:
J. CLINTON HILL,
T. L. PAINTER.